United States Patent [19]

Chang et al.

[11] 4,143,214

[45] Mar. 6, 1979

[54] CELLS HAVING CATHODES CONTAINING $C_xS$ CATHODE-ACTIVE MATERIALS

[75] Inventors: Chin H. Chang, Edison; John M. Longo, New Providence, both of N.J.

[73] Assignee: Exxon Research & Engineering Co., Florham Park, N.J.

[21] Appl. No.: 919,141

[22] Filed: Jun. 26, 1978

[51] Int. Cl.² .............................................. H01M 6/36
[52] U.S. Cl. .................................. 429/112; 429/191; 429/194; 429/196
[58] Field of Search ................ 429/112, 191, 194, 213, 429/196

[56] References Cited

U.S. PATENT DOCUMENTS

| 3,762,954 | 10/1973 | Metcalfe et al. | 423/460 |
| 3,811,947 | 5/1974 | Metcalfe et al. | 429/112 |

Primary Examiner—Charles F. LeFevour
Attorney, Agent, or Firm—Kenneth P. Glynn

[57] ABSTRACT

The present invention is directed to an electric current-producing cell which contains:

(a) an anode having as its anode-active material one or more alkali metals;

(b) a cathode having as its cathode-active material one or more carbon-sulfur compounds having the formula: $C_xS$, wherein x is a numerical value within the range of about 4 to about 50; and, (c) an electrolyte which is chemically inert with respect to said anode and said cathode and which permits the migration of ions between said anode and said cathode.

20 Claims, 6 Drawing Figures

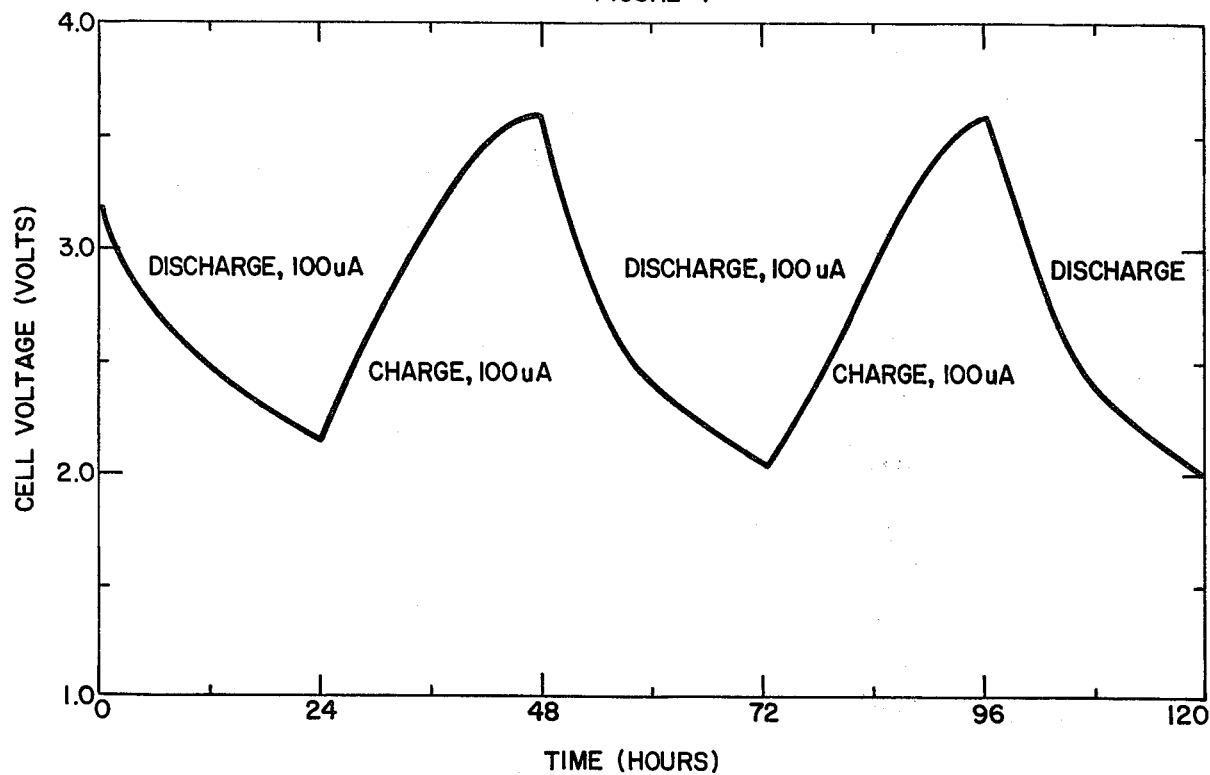
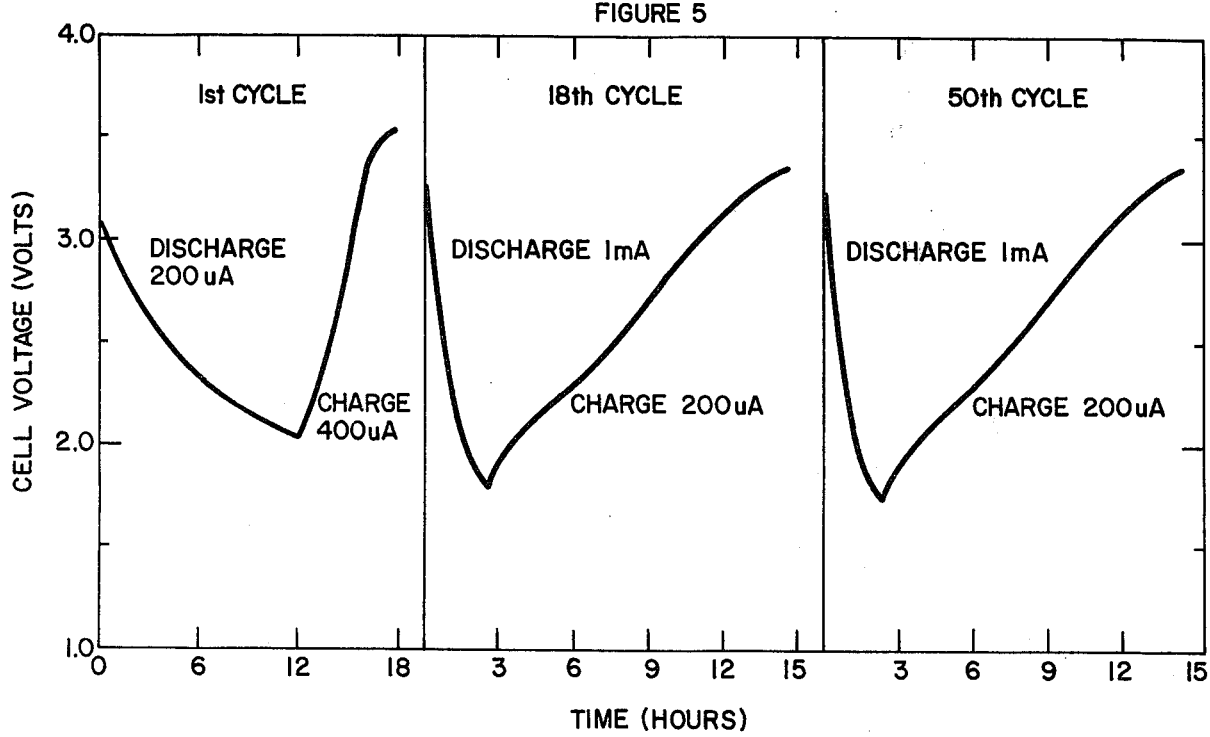

CELLS HAVING CATHODES CONTAINING $C_xS$ CATHODE-ACTIVE MATERIALS

BACKGROUND OF THE INVENTION

1. Field of the Invention

The present invention relates to electric current-producing cells, and more particularly to such cells employing specified cathode-active materials comprising one or more carbon-sulfur compounds having the formula $C_xS$, wherein x is specified.

2. Prior Art

There has been considerable interest in recent years in developing high energy density batteries for voltaic cells. Exemplary of the developing systems is a high energy density electrochemical cell utilizing compounds of the transition metal chalcogenides such as titanium disulfide as cathode-active materials and using alkali metal anodes, e.g., as set forth in U.S. Pat. No. 4,009,052. U.S. Pat. No. 3,992,222 describes a cell having, for example, a lithium anode-active material, a molten electrolyte, and mixtures of $FeS_2$ and various metal sulfides as its cathode-active material. U.S. Pat. No. 4,049,879 describes alkali metal anode, chalcogenide cathode cells wherein the cathode-active chalcogenides are transition metal phosphorus chalcogenides such as $Li_4FePS_3$, $K_6FePS_3$, $Li_3FePS_3$, $LiNaFePS_3$, $LiNaKFePS_3$, $LiK(NiFe)PS_3$, and the like. Other U.S. Patents, e.g. Nos. 3,645,792, 3,762,954, and 3,811,947, describe cells having, for example, alkali metal anodes, and carbon cathodes wherein these cathodes are treated with sulfur/sulfur compounds to yield carbon-containing, sulfur-containing cathode-active materials.

Although there has been extensive development of various alkali metal anode cells having sulfur, sulfur compound and carbon cathodes such as those described in the above-mentioned exemplary prior art references, research continues for alkali metal anode, sulfur compound cathode type cells which exhibit acceptable cathode-active material capabilities yet utilize relatively inexpensive cathode-active materials. Notwithstanding the considerable variety of high energy density electrochemical cell systems which have recently been developed, it is believed that the particular cells of the present invention, which utilize a desirable combination of relatively inexpensive yet relatively active cathode-active materials, have not been heretofore disclosed or rendered obvious.

SUMMARY OF THE INVENTION

The present invention is directed to an electric current-producing cell which contains:

(a) an anode having as its anode-active material one or more alkali metals;

(b) a cathode having as its cathode-active material one or more carbon-sulfur compounds having the formula: $C_xS$ wherein x is a numerical value within the range of about 4 to about 50; and, (c) an electrolyte which is chemically inert with respect to said anode and said cathode and which permits the migration of ions between said anode and said cathode.

DETAILED DESCRIPTION OF THE INVENTION

Figure 1:
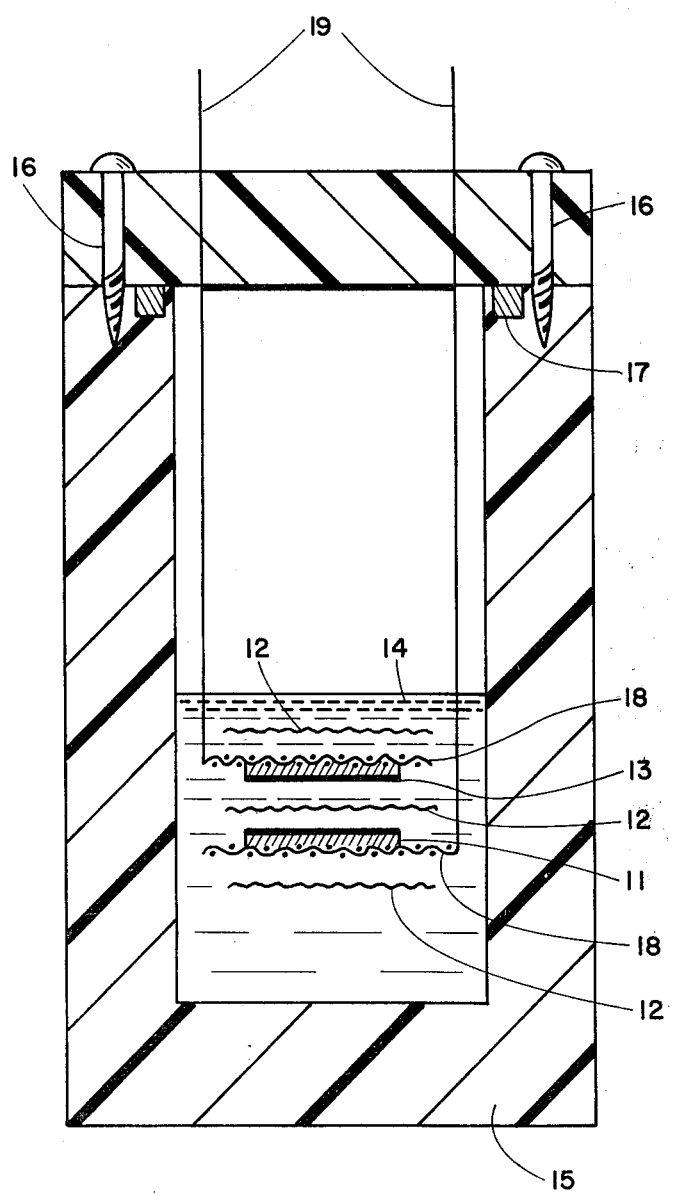

As mentioned, the electric current-producing cell of the present invention is one which contains a specified anode, a functional electrolyte, and a cathode having as its cathode-active material, one or more carbon-sulfur compounds having the formula: $C_xS$, wherein x has a specified numerical value.

In general, the anode employed in the cell of the present invention is one which contains as its anode-active material one or more metals selected from the group consisting of the Periodic Table Group IA metals. Of these Group IA metals, also known as the alkali metals, lithium and sodium are desirable. Preferred is the anode having lithium as its anode-active material. It should be noted that the alkali metals used in the anodes are meant to include both pure alkali metals and alloys containing these, e.g., lithium-aluminum alloys. The anode-active material may be in contact with other metal structures in the cell of the present invention, as desired. Thus, the anode-active materials, e.g. lithium, may be in contact with metal structures such as nickel, copper or silver screen, which serve as current collectors. These anode configurations are a matter of design and are well known in the art.

The cathode employed in the cell of the present invention is one which contains as its cathode-active material one or more carbon-sulfur compounds having the formula: $C_xS$, wherein x is a numerical value within the range of about 4 to about 50. Desirably, x is within the range of about 4 to about 20. Preferred is x within the range of about 4 to about 10.

The carbon-sulfur compound $C_xS$ cathode-active materials of the present invention may be prepared by reacting a carbonaceous material at elevated temperatures (e.g., between about 400° and about 700° C.) with a sulfur-containing gas such as hydrogen sulfide ($H_2S$), sulfur dioxide ($SO_2$), elemental sulfur(s) and the like (see H. E. Blayden and J. W. Patrick, Carbon, Vol. 5, pp. 533–544, Pergamon Press Ltd., Great Britain, 1967; and B. R. Pari and R. S. Hazra, Carbon, Vol. 9, pp. 123–134, Pergamon Press Ltd., Great Britain, 1971, the disclosures of which are incorporated herein by reference). The reaction may be carried out in a simple flow system or a fluidized bed, if desired. Suitable carbonaceous materials from which $C_xS$ may be prepared include coal chars, conventional activated carbons, petroleum fluid coke, sucrose char, various polymeric chars (e.g., polyvinylidene difluoride char) and the like. The value of x may vary depending on the starting materials and reaction conditions. It may range broadly, e.g., from about 4 to about 50, which corresponds to from about 40 to about 5 wt. % sulfur. Also, x need not be an integer and may, therefore, be some fractional value within this range, e.g. 12.5.

The $C_xS$ materials used in the present invention may be characterized as surface compounds of carbon with variable compositions. The materials prepared as described above are thermally stable up to 600° C. as measured by thermogravimetric analysis (TGA) in inert gas. They are generally inert to acid, base and organic solvents — an exception being highly concentrated nitric acid. The sulfur is chemically bound and it cannot be extracted by carbon disulfide — an excellent solvent for elemental sulfur.

Advantageously, the cathode-active materials used in the cells of the present invention may simply be pressed or hot pressed into a cathode structure, with or without supporting materials. The cathode-active material may be supported on structures such as carbon, copper, nickel, stainless steel, iron, etc., and it may be supported on such materials or it may be impregnated into such materials. In one preferred embodiment, the cathode does not contain any conductive diluents within the cathode-active material, such as elemental carbon. However, plastic binding agents such as polyfluoroethylene may be utilized if desired.

The electrolyte used in the cell of the present invention is any electrolyte which is chemically inert with respect to the anode and with respect to the cathode, and which permits the migration of ions between the anode and the cathode. The electrolyte may typically be a nonaqueous alkali metal salt-organic solvent electrolyte solution. These alkali metal salts are well known in the art and need not be enumerated herein. However, such salts include the lithium and sodium salt complexes which are dissolved in organic solvents such as inertly substituted and unsubstituted ethers, sulfones, organic sulfates, organic sulfites, organic nitrites and organic nitro compounds. One preferred electrolyte for use in conjunction with cells containing lithium as its anode-active material is an electrolyte containing lithium perchlorate salt dissolved in dioxolane or dioxolane-containing solution. Alternatively, the electrolyte may be a solid such as beta-alumina or an alkali metal halide, or a molten salt.

The electrolyte used in the cell of the present invention may also be a nonaqueous alkali metal salt-inorganic solvent electrolyte solution. U.S. Pat., e.g. Nos. 3,891,457, 3,891,458 and 3,966,490, describe cells having carbon cathodes in the inorganic electrolyte system in which the inorganic solvent acts as an active cathodic depolarizer as well as a solvent. The inorganic electrolyte has an inorganic solvent material selected from the group consisting of phosphorus oxychloride, monofluorophosphoryl dichloride, thionyl chloride, sulfuryl chloride, and mixtures thereof. A solute is dissolved in the inorganic solvent which provides the cation of the anode metal and at least one anion of the general formula $JX_4^-$, $QX_6^-$, and $LX_6^-$, where J is an element selected from the group consisting of boron and aluminum, Q is an element selected from the group consisting of phosphorus, arsenic, and antimony, L is an element selected from the group consisting of tin, zirconium, and titanium, and X is any halogen. Preferred electrolytes for use in conjunction with cells containing lithium as its anode-active material are the lithium aluminum halides and most preferred is an electrolyte containing lithium tetrachloroaluminate. A preferred salt is thionyl chloride. Thus, these lithium salts are the lithium boron halides, the lithium aluminum halides, the lithium phosphorus halides, the lithium arsenic halides, the lithium antimony halides, the lithium tin halides, the lithium zirconium halides, the lithium titanium halides and mixtures thereof.

The electric current-producing cells of the present invention containing the above-mentioned anodes, cathodes and electrolytes not only have high energy densities, but are also capable of being cycled through charging and discharging, and may be readily produced on a large-scale basis.

The present invention is illustrated by the following examples, but the invention should not be construed by being limited thereto.

EXAMPLE 1

$C_xS$ materials may be prepared by reacting carbonaceous materials with sulfur-containing agents at elevated temperatures. In this example, about 8 grams of a carbonaceous material were contained in the center part of a one-inch vycor tube which was connected through a 24/40 vycor ground joint to a Buchler rotating evaporator with a vacuum take-off (Model PFE-1BN). Sulfur dioxide ($SO_2$) was introduced into the reactor through the vacuum take-off end of the evaporator. Quartz wools and ceramic honeycombs were used to prevent the flow of carbon powders to the down stream end of the vycor reactor. To improve the mixing of the carbonaceous solid and the gaseous $SO_2$, a static mixer made of quartz was inserted in the reactor. The downstream end of the reactor was connected to a stainless steel swivel through a Cajon reducer. To prevent the flow of fine carbon powders to the downstream side, the reactor tubing was tilted several degrees to the ground level. The reactor tube is heated by an electric tube furnace and sulfurized products were later cooled in dry nitrogen and collected.

Carbonaceous materials examined are exemplified as shown in Table I. Graphone, carbon black and commercial activated carbons were obtained from commercial suppliers. Activated coke was obtained by steam activation and charcoals were obtained by a programmed carbonization procedure. About 25g of polymers were contained in a quartz boat which was heated in a vycor tubing by an electric furnace. A stream of dry nitrogen was maintained during the course of heating. The carbonization temperature was increased from 24° C. at a rate of 5°/min. up to various maximum temperatures and the final temperature was maintained for a period of 30 minutes before the heat was shut off and the carbonized product was cooled down and collected.

TABLE I
Some Properties of Carbonaceous Materials Used in Example 1

| Carbonaceous Materials | Carbon wt. % | Surface Area ($m^2g$) |
| --- | --- | --- |
| Graphon | 99 | 75 |
| Black pearls 1300 | 97 | 459 |
| Activated Coke | 77 | 306 |
| Sucrose Charcoal | 84 | 12 |
| PVDF Charcoal | 97 | 850 |
| Activated Carbon 1 | 78 | 1302 |
| Activated Carbon 2 | 91 | 459 |

The carbon weight percent and the surface area of the carbonaceous materials used in this example are listed in Table I where the surface area was determined by a low temperature nitrogen adsorption technique which was first reported by Brunauer, Emmet and Teller (*Journal of American Chemical Society*, Vol. 60, p. 309, American Chemical Society, 1938, the disclosures of which are incorporated herein by reference) and the carbon content was determined by measuring the combustion product of the material by a gas chromatograph using oxygen as the carrier gas. Particle sizes of these carbonaceous materials ranging from 100 microns to 2 millimeters were used in this example.

The carbonaceous material was reacted with $SO_2$ at 600° C. for 3 hours. The yield of $C_xS$ depended on the type of carbonaceous materials used and the preparation conditions. Typically, a yield of about 70% was obtained. The surface area, sulfur weight percent and X in $C_xS$ of the product thus prepared are shown in Table II, where the sulfur weight percent was determined by a combustion-gas chromatographic method.

TABLE II

Some Properties of $C_xS$ Materials

| Carbonaceous Material | Sulfur Wt. % | X in $C_xS$ | Surface Area (m²/g) |
|---|---|---|---|
| Graphon | 0 | ∞ | 39 |
| Black pearls 1300 | 4.4 | 57.9 | 543 |
| Activated Coke | 27.8 | 6.9 | 430 |
| Sucrose Charcoal | 34.4 | 5.1 | 548 |
| PVDF Charcoal | 24.8 | 8.1 | 1208 |
| Activated Carbon 1 | 26.0 | 7.6 | 771 |
| Activated Carbon 2 | 38.1 | 4.3 | 487 |

Examples 2-4 show the characteristics of $C_xS$ compounds as cathode-active materials.

EXAMPLE 2

Figure 2:
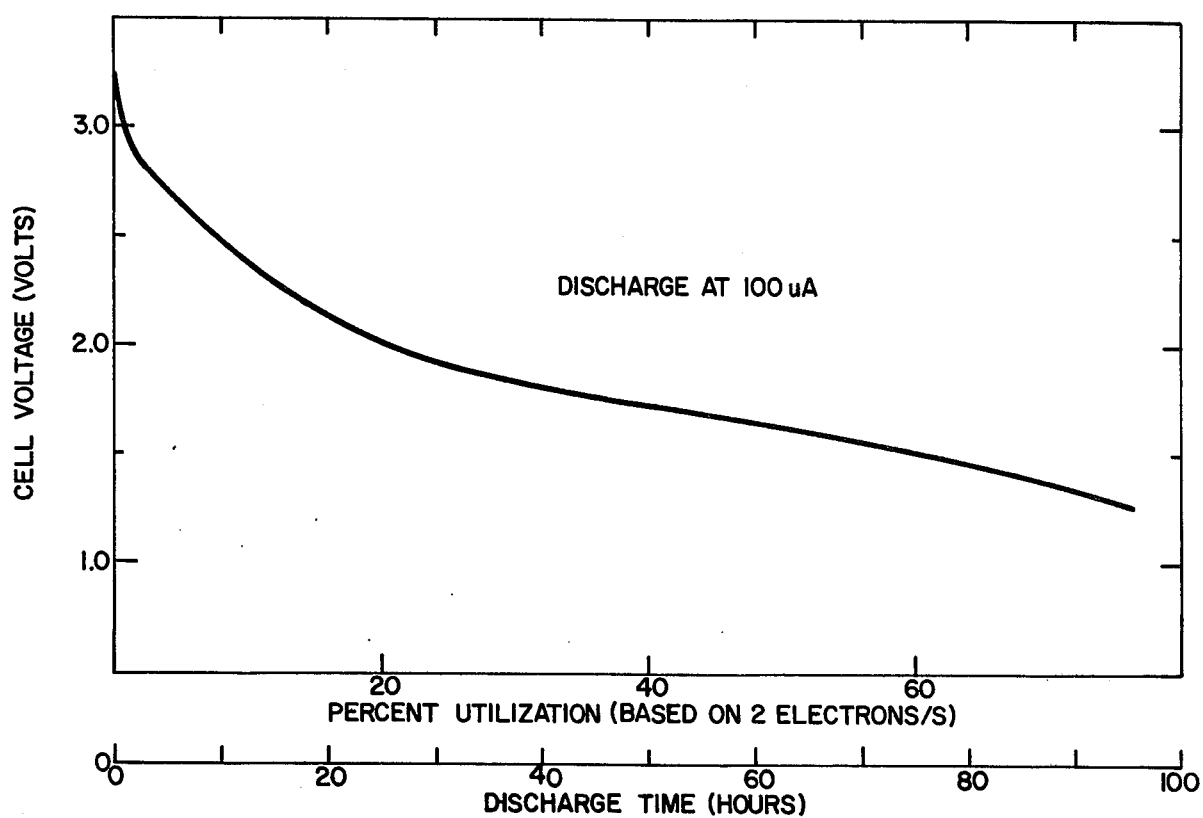

In this example, 19.5 mg of $C_xS$ prepared from activated carbon 2 were mixed with 8.4 mg of graphite and 0.015 cc of a water suspension of polytetrafluoroethylene (0.415 g of polytetrafluoroethylene per cc) were added to this mixture to form a thick paste. The paste was evenly spread in a 1 cm² cavity of a stainless steel pressing die positioned on a 1.2 cm × 1.2 cm square nickel screen which had a sheet of polytetrafluoroethylene underneath. The nickel screen had a previously spot welded nickel wire lead attached. A 1 cm² polytetrafluoroethylene disc was then placed on the cavity and the assembly was pressed to 6500 lb. pressure at 24° C. for a period of several minutes. The lithium anodes were prepared by pressing commercial lithium ribbon (½ in. wide and 1/16 in. thick) onto a 1.2 cm × 1.2 cm square nickel screen to which a nickel lead had previously been spot welded. The test cell was assembled as shown in FIG. 1. The cell included a cathode-active material 11, and an anode-active material 13, each sandwiched between two layers of glass fiber filter paper 12. Both electrodes 11 and 13 and filter paper 12 were rigidly positioned on polytetrafluoroethylene supports (not shown). The cathode-active material 11 and anode-active material 13 were pressed onto Ni screens 18 with Ni wires 19 spot welded to the screens 18 as described in the electrode preparation. The electrodes 11 and 13 and filter paper 12 were immersed in electrolyte 14 which was contained in a polytetrafluoroethylene container 15 with end cover 16 and O-ring 17 seal between the container 15 and cover 16. The open circuit potential of the above-described cell in an electrolyte, which consists of 2 molar lithium perchlorate in a mixture of tetrahydrofuran and propylene carbonate, was 3.36 volts. FIG. 2 shows the discharge potential of this cell at a constant current rate of 100 A. At a cut-off potential of 1.5 volts, a cathode utilization of 62% was obtained based on 2 electrons/S.

EXAMPLE 3

Following the general procedures of Example 2, a test cell containing 19.3 mg of $C_xS$ was prepared from activated carbon 1, 8.3 mg graphite and 5.8 mg polytetrafluoroethylene as the cathode mixture was assembled. The open circuit potential of the cell in the electrolyte, which consists of 2 molar lithium perchlorate in a mixture of tetrahydrofuran and propylene carbonate, was 3.27 volts. At a cut-off potential of 1.5 volts, a total of 5 mAH was discharged which corresponds to a cathode utilization of 60% at a current rate of 100 $\mu A$.

EXAMPLE 4

Following the general procedures of Example 2, a test cell containing 41.3 mg of $C_xS$ prepared from PVDF charcoal and 9.9 mg polytetrafluoroethylene as the cathode mixture was assembled. The open circuit potention of the cell in the electrolyte, which consists of 1 molar lithium perchlorate in propylene carbonate, was 3.23 volts. At a cut-off potential of 1.5 volts, a total of 5.6 mAH was discharged which corresponds to a cathode utilization of 37% at a current rate of 100 $\mu A$.

Examples 5-14 show the effect of electrolyte and discharge current rate on the performance of $C_xS$ cathode-active materials.

EXAMPLE 5

Figure 3:
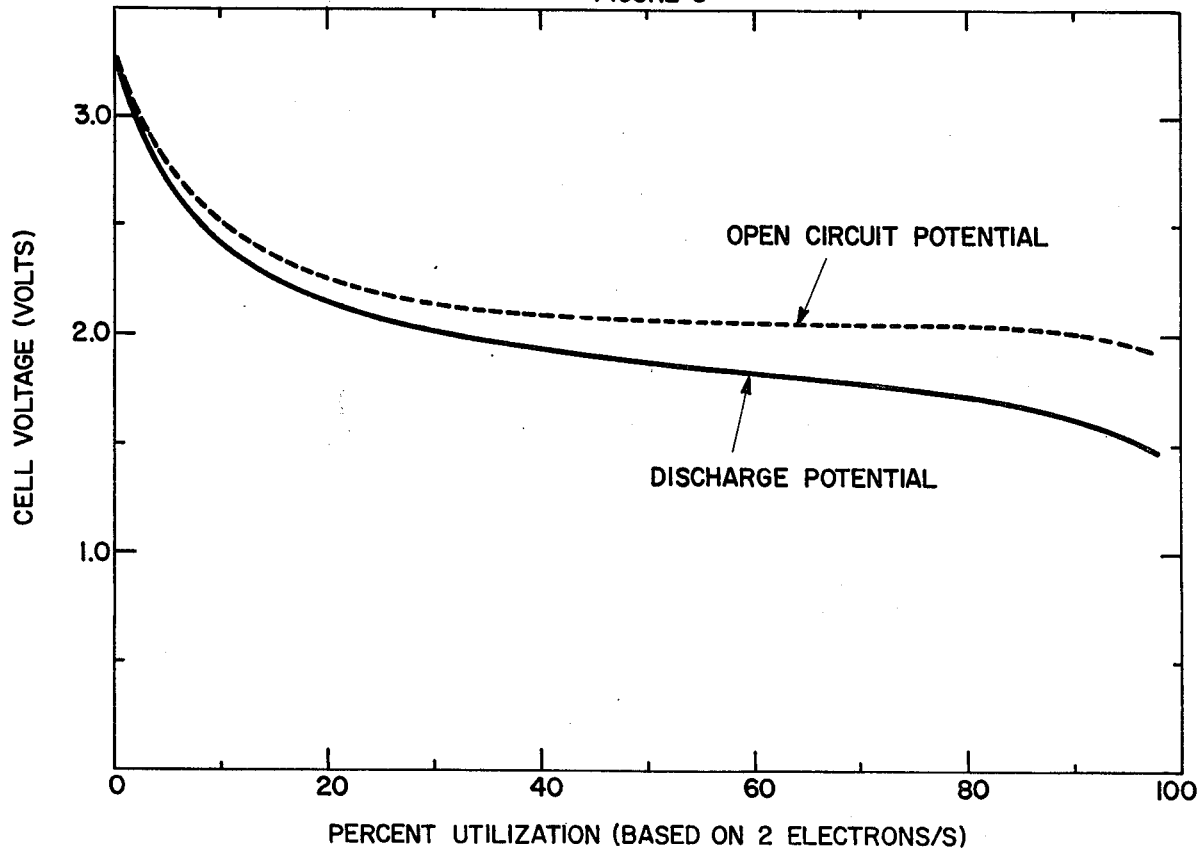

Following the general procedures of Example 2, a test cell containing 19.9 mg of $C_xS$ prepared from PVDF charcoal, 8.5 mg graphite and 5.8 mg polytetrafluoroethylene as the cathode mixture was assembled. The electrolyte used in this example consisted of 1 molar lithium perchlorate in a mixture of tetrahydrofuran and propylene carbonate. The initial open circuit potential was 3.35 volts. The cell was discharged at a current rate of 100 $\mu A$. It was discharged at the constant current rate for 2 hours and the open circuit potentials were measured after two hours. FIG. 3 shows the closed and open circuit potentials of the discharge of the above-described cell. The test cell had a cathode utilization of 96% at a cut-off potential of 1.5 volts and 74% at a cut-off potential of 1.75 volts.

EXAMPLE 6

Following the general procedure of Example 5, a test cell containing 20.3 mg of $C_xS$ prepared from PVDF, 8.7 mg graphite and 5.7 mg polytetrafluoroethylene as the cathode mixture was assembled. The initial open circuit potential was 3.42 volts and at a cut-off potential of 1.5 volts a cathode utilization of 35% was measured at a current rate of 1 mA.

EXAMPLE 7

Following the general procedure of Example 5, a test cell containing 20.2 mg of $C_xS$ prepared from PVDF and 4.0 mg of polytetrafluoroethylene as the cathode mixture was assembled. The electrolyte used in this example consisted of 2.5 molar lithium perchlorate in dioxolane. The cell had an initial open circuit potential of 3.19 volts. At a cut-off potential of 1.75 volts, a cathode utilization of 50% was obtained at a current rate of 100 $\mu A$.

EXAMPLE 8

Following the general procedure of Example 7, a test cell containing 22.0 mg of $C_xS$ prepared from PVDF, 9.4 mg graphite and 5.5 mg polytetrafluoroethylene as the cathode mixture was assembled. The initial open-circuit potential of the cell was 3.30 volts. At a cut-off potential of 1.75 volts, a cathode utilization of 20% was obtained at a current rate of 1 mA.

EXAMPLE 9

Following the general procedure of Example 5, a test cell containing 24.3 mg of $C_xS$ prepared from PVDF and 3.6 mg of polytetrafluoroethylene as the cathode mixture was assembled. The electrolyte used in this example consisted of 1 molar lithium perchlorate in dimethyl sulfoxide. The initial open-circuit potential of the cell was 3.27 volts. The test cell was discharged at a current rate of 100 $\mu A$. It had a cathode utilization of 42% at 1.75 volt and 71% at 1.50 volt cut-off potentials.

EXAMPLE 10

Following the general procedure of Example 5, a test cell containing 26.0 mg of $C_xS$ prepared from PVDF and 11.1 mg acetylene black and 8.2 mg polytetrafluoroethylene as the cathode mixture was assembled. The electrolyte used in this example consisted of 2 molar lithium perchlorate in a mixture of tetrahydrofuran and dimethoxyethane. The initial open-circuit potential of the cell was 3.23 volts. The test cell was discharged at a current rate of 200 μA. It had a cathode utilization of 35% at 1.70 volt cut-off potential.

EXAMPLE 11

Following the general procedure of Example 5, a test cell containing 12.1 mg of $C_xS$ prepared from PVDF, 5.2 mg graphite and 1.9 mg polytetrafluoroethylene as the cathode mixture was assembled. The electrolyte used in this example consisted of 2 molar potassium thiocyanate in dimethyl sulfoxide. The initial open-circuit potential of the cell was 3.09 volts. The cell was discharged at a current rate of 100 μA. It had a cathode utilization of 112% at a cut-off potential of 1.63 volts.

EXAMPLE 12

Following the general procedure of Example 2, a test cell containing 20.2 mg of $C_xS$ material prepared from activated carbon 1, 8.7 mg graphite and 8.5 mg polytetrafluoroethylene as the cathode mixture was assembled. The electrolyte used in this example consisted of 2 molar potassium thiocyanate in dimethyl sulfoxide. The initial open-circuit potential of the cell was 3.37 volts. The test cell was discharged continuously at a current rate of 100 μA. It had a cathode utilization of 136% at a cut-off potential of 1.5 volts.

EXAMPLE 13

Following the general procedure of Example 2, a test cell containing 10.4 mg of $C_xS$ prepared from activated carbon 1, 4.5 mg graphite and 5.4 mg polytetrafluoroethylene as the cathode mixture was assembled. The electrolyte used in this example consisted of 2.8 molar lithium thiocyanate in a mixture of dioxolane and dimethoxyethane. The initial open-circuit potential of the cell was 2.98 volts. The test cell was discharged continuously at a current rate of 100 μA. It had a cathode utilization of 52% at a cut-off potential of 1.5 volts.

EXAMPLE 14

Following the general procedure of Example 12, a test cell containing 17.4 mg of $C_xS$ prepared from activated carbon 1, 7.4 mg graphite and 5.7 mg polytetrafluoroethylene as the cathode mixture was assembled. The initial open-circuit potential of the cell was 3.40 volts. The test cell was discharged continuously at a current rate of 1 mA. It had a cathode utilization of 66% at a cut-off potential of 1.5 volts.

Examples 15 and 16 show the rechargeability of $C_xS$ cathode-active materials.

EXAMPLE 15

Following the general procedure of Example 2, a test cell containing 44.7 mg of $C_xS$ prepared from PVDF charcoal and 9.7 mg of polytetrafluoroethylene as the cathode mixture was assembled. The electrolyte used in this example consisted of 2 molar lithium perchlorate in a mixture of tetrahydrofuran and dimethoxyethane. The initial open-circuit potential of the cell was 3.35 volts. The cell was discharged continuously at current rate of 100 μA for 24 hours which corresponded to a cathode utilization of 13%. It was then charged continuously at 100 μA rate for 24 hours. FIG. 4 shows the discharging and charging potentials for 3 discharging and 2 charging cycles. At the third discharging cycle a cathode utilization of 46% was obtained at a cut-off potential of 1.50 volts.

EXAMPLE 16

Following the general procedure of Example 15, a test cell containing 31.6 mg of $C_xS$ prepared from PVDF charcoal, 13.6 mg acetylene black and 8.0 mg polytetrafluoroethylene as the cathode mixture was assembled. The initial open-circuit potential of the cell was 3.27 volts. The cell was discharged continuously at 200 μA for 12 hours which corresponded to a cathode utilization of 18%. It was then charged at 400 μA rate for 6 hours. The discharging and charging potentials of the first cycle are shown in FIG. 5. Various charging and discharging current rates were used from the second cycle to 17th cycle. Starting 18th cycle discharging was carried out at 1 ma for 2.4 hours and charging was performed at 200 μA for 12 hours. FIG. 5 shows also the discharging and charging potentials of the 18th and 50th cycles. No significant loss of cathode capacity was observed up to 102 cycle after which the test was terminated.

Examples 17–20 show the characteristics of $C_xS$ materials as cathode in the inorganic electrolyte cell.

EXAMPLE 17

Following the general procedure of Example 2, a test cell containing 23.3 mg of $C_xS$ prepared from PVDF charcoal, 10 mg graphite and 6.6 mg polytetrafluoroethylene-2 as the cathode mixture was assembled. The electrolyte used in this example was a 1.5 molar solution of lithium tetrachloroaluminate in thionyl chloride. The electrolyte solution was prepared by dissolving 1.590 g of anhydrous lithium chloride and 5.001 g of anhydrous aluminum trichloride in 25 ml of prepurified thionyl chloride and the solution was dried over lithium metal for a period of more than a week before it was used.

Figure 6:
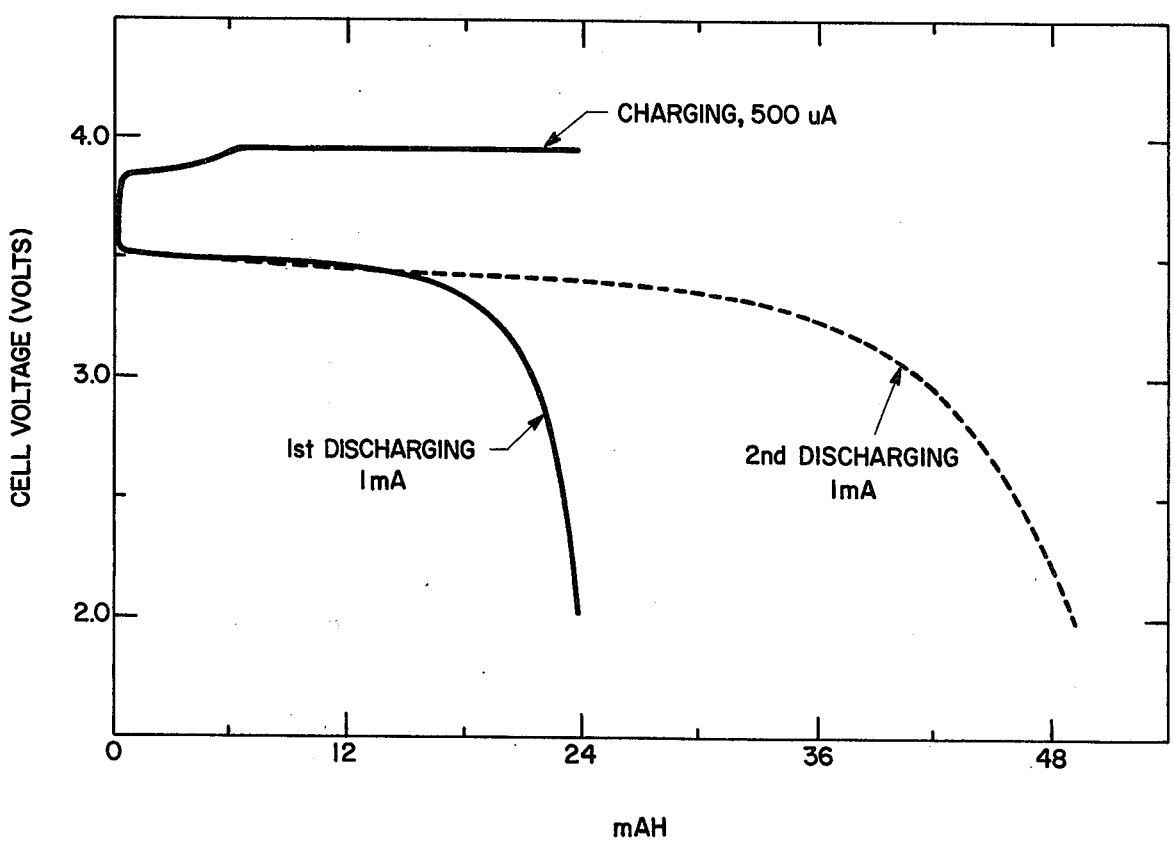

The initial open-circuit potential of the cell was 3.61 volts. It was discharged continuously at a constant current rate of 1 mA. A total of 24 mAH was discharged at a cut-off potential of 2.00 VOH. The cell was then charged at a constant current of 500 μA for a total of 24 mAH. The cathode capacity was increased to 49.4 mAH with the same discharge rate in the second discharge. FIG. 6 shows the discharging and charging potentials of the above-described cell.

EXAMPLE 18

Following the general procedure of Example 17, a test cell containing 18.5 mg of $C_xS$ prepared from sucrose charcoal, 7.9 mg graphite and 2.9 mg polytetrafluoroethylene as the cathode mixture was assembled. The electrolyte used in this example was a 1.5 molar solution of lithium tetrachloroaluminate in thionyl chloride. The initial open-circuit potential was 3.51 volts. The cell was discharged continuously at a constant current of 1 mA and charged at a constant current of 500 μA. At a cut-off potential of 2.00 volts, a total of 17.5, 24.1 and 20.0 mAH was measured respectively for the first, second and third discharge cycle.

EXAMPLE 19

Following the general procedure of Example 17, a test cell containing 10.5 mg of $C_xS$ prepared from PVDF charcoal, 4.5 mg graphite and 1.7 mg polytetrafluoroethylene as the cathode mixture was assembled. The electrolyte used in this example was a 1.5 molar solution of lithium tetrachloroaluminate in thionyl chloride. The initial open-circuit potential was 3.65 volts. Following the same discharging and charging cycle as described in Example 18, a total of 16.7, 19.9 and 19.4 mAH was discharged respectively at a cut-off potential of 2.00 volts for the first, second and third discharge cycles.

EXAMPLE 20

Following the general procedure of Example 17, a test cell containing 14.7 mg of $C_xS$ prepared from PVDF charcoal, 6.3 mg graphite and 2.3 mg polytetrafluoroethylene as the cathode mixture was assembled. The electrolyte used in this example was a 1.5 molar solution of lithium tetrachloroaluminate in thionyl chloride. Following the same discharging and charging cycle as described in Example 18, 5 cycles were measured. Table III shows the cycling results and the regeneration efficiency, which is defined as the percent ratio between the total mAH discharged to the same 2.00 volts cut-off and the total mAH used to regenerate the cathode.

TABLE III
SUMMARY OF CYCLING MEASUREMENTS ON EXAMPLE 20

| Cycle | I | II | III | IV | V |
|---|---|---|---|---|---|
| Charge (mAH) | — | 19.2 | 23.5 | 22.7 | 24.0 |
| Discharge (mAH) | 19.2 | 23.5 | 22.7 | 23.2 | 23.4 |
| Regeneration Efficiency (%) | — | 122 | 97 | 102 | 98 |

What is claimed is:

1. An electric current-producing cell, comprising:
   (a) an anode having as its anode-active material one or more alkali metals;
   (b) a cathode having as its cathode-active material one or more carbon-sulfur compounds having the formula:

$$C_xS$$

wherein x is a numerical value within the range of about 4 to about 50; and,
   (c) an electrolyte which is chemically inert with respect to said anode and said cathode and which permits the migration of ions between anode and said cathode.

2. The cell of claim 1 wherein x is within the range of about 4 to about 20.

3. The cell of claim 2 wherein x is within the range of about 4 to about 10.

4. The cell of claim 1 wherein said anode-active material is selected from the group consisting of lithium and sodium.

5. The cell of claim 4 wherein x is within the range of about 4 to about 20.

6. The cell of claim 5 wherein x is within the range of about 4 to about 10.

7. The cell of claim 1 wherein said anode-active material is lithium.

8. The cell of claim 7 wherein x is within the range of about 4 to about 20.

9. The cell of claim 8 wherein x is within the range of about 4 to about 10.

10. The cell of claim 1 wherein the electrolyte contains at least one cyclic ether solvent.

11. The cell of claim 1 wherein said anode-active material is lithium and said electrolyte is a lithium salt dissolved in a solvent containing at least one organic ether.

12. The cell of claim 1 wherein said electrolyte is a solid.

13. The cell of claim 1 wherein said electrolyte is a molten salt.

14. The cell of claim 1 wherein said electrolyte is an alkali metal salt dissolved in an inorganic solvent.

15. The cell of claim 14 wherein said inorganic solvent is selected from the group consisting of phosphorus oxychloride, monofluorophosphoryl dichloride, thionyl chloride, sulfuryl chloride, and mixtures thereof.

16. The cell of claim 15 wherein said anode-active material is lithium and said alkali metal salt is a lithium salt.

17. The cell of claim 16 wherein said lithium salt is selected from the group consisting of lithium boron halides, lithium aluminum halides, lithium phosphorus halides, lithium arsenic halides, lithium antimony halides, lithium tin halides, lithium zirconium halides, lithium titanium halides and mixtures thereof.

18. The cell of claim 17 wherein said lithium salt is a lithium aluminum halide.

19. The cell of claim 18 wherein said lithium salt is lithium tetrachloroaluminate.

20. The cell of claim 19 wherein said solvent is thionyl chloride.

* * * * *

UNITED STATES PATENT OFFICE
CERTIFICATE OF CORRECTION

Patent No. 4,143,214     Dated March 6, 1979

Inventor(s) Chin H. Chang and John M. Longo

It is certified that error appears in the above-identified patent and that said Letters Patent are hereby corrected as shown below:

Title, "CELLS HAVING CATHODES CONTAINING $C_s S$ CATHODE-ACTIVE MATERIALS", should read --CELLS HAVING CATHODES CONTAINING $C_x S$ CATHODE-ACTIVE MATERIALS--.

Signed and Sealed this

Nineteenth Day of June 1979

[SEAL]

Attest:

RUTH C. MASON
Attesting Officer

DONALD W. BANNER
Commissioner of Patents and Trademarks